(12) United States Patent
Lawrence et al.

(10) Patent No.: US 8,106,336 B2
(45) Date of Patent: Jan. 31, 2012

(54) FOOD WARMING MAT AND METHOD FOR MAKING

(76) Inventors: Sara Ann Lawrence, Lavon, TX (US); Christopher Eric Lawrence, Lavon, TX (US)

( * ) Notice: Subject to any disclaimer, the term of this patent is extended or adjusted under 35 U.S.C. 154(b) by 1126 days.

(21) Appl. No.: 11/981,294

(22) Filed: Oct. 31, 2007

(65) Prior Publication Data

US 2008/0245784 A1  Oct. 9, 2008

Related U.S. Application Data

(60) Provisional application No. 60/921,624, filed on Apr. 3, 2007.

(51) Int. Cl.
*H05B 3/68* (2006.01)
(52) U.S. Cl. .................. 219/458.1; 219/450.1
(58) Field of Classification Search ............... 219/450.1, 219/458.1, 528, 529, 535–539, 541–549
See application file for complete search history.

(56) References Cited

U.S. PATENT DOCUMENTS

| | | | | |
|---|---|---|---|---|
| 2,783,358 A * | 2/1957 | Wolf | | 219/529 |
| 3,172,072 A * | 3/1965 | Willy | | 338/210 |
| 4,058,704 A * | 11/1977 | Shimizu | | 219/528 |
| 4,060,710 A * | 11/1977 | Reuter et al. | | 219/548 |
| 4,733,057 A * | 3/1988 | Stanzel et al. | | 219/548 |
| 6,452,138 B1 * | 9/2002 | Kochman et al. | | 219/549 |
| 7,228,886 B2 * | 6/2007 | Seki et al. | | 165/56 |
| 2008/0110870 A1 * | 5/2008 | Mirkes et al. | | 219/218 |

* cited by examiner

*Primary Examiner* — Sang Paik

(57) ABSTRACT

A non-curling flexible food warmer with evenly heated surface for use in table-top banquet style settings with an integrated temperature control and with transversely oriented heating elements such that it may be readily rolled up for storage without damage to the heating elements. In one embodiment the body of the food warmer also has transversely oriented channels that permit the warmer to be folded accordion style without damage to the heating elements.

4 Claims, 4 Drawing Sheets

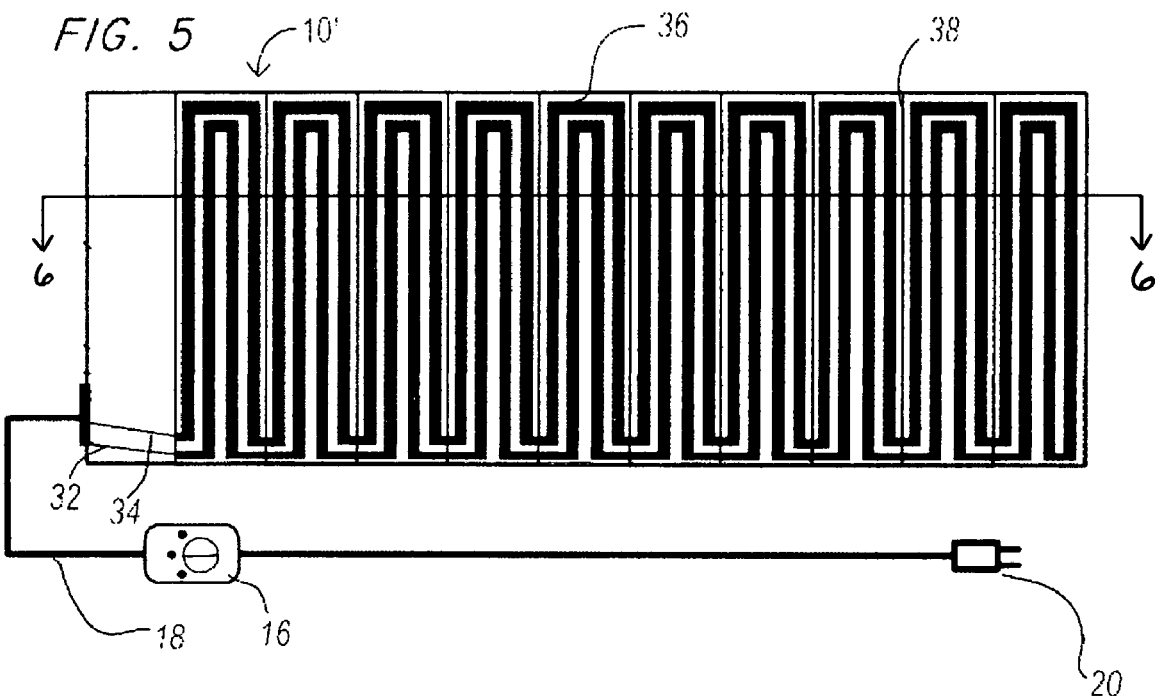
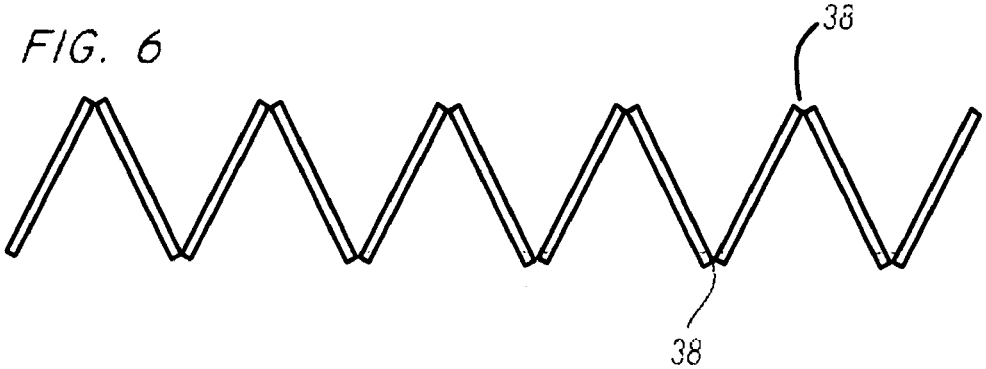
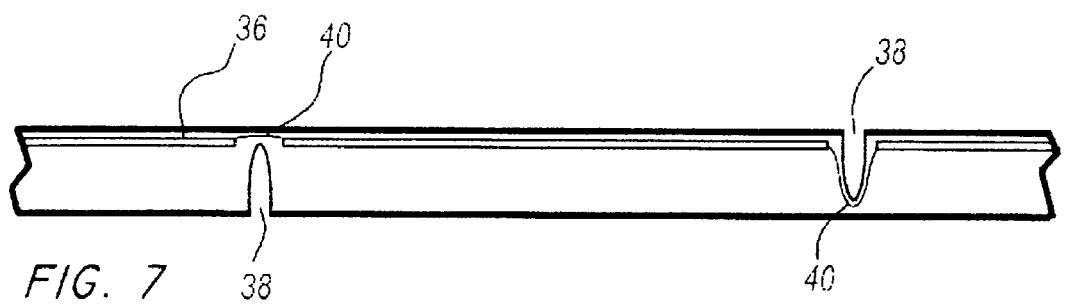

FOOD WARMING MAT AND METHOD FOR MAKING

CROSS REFERENCE TO RELATED APPLICATIONS

This application claims the benefit of U.S. Provisional Application No. 60/921,624 filed Apr. 3, 2007 titled: Flexible Food Warming Device

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

Traditionally food warming devices for banquet style serving fall into four basic categories: Chafing dishes, stainless steel drop-in food warmers utilizing coiled heating elements, steam tables using coiled heating elements for convective heat transfer through a liquid medium such as water jacket, and infrared heat lamps; all of which require much care in operation due to the magnitude of heat produced and which are cost prohibitive and bulky for home use. It is common knowledge that using such devices can be hazardous. Many fire authorities have banned the use of open flame chafing dishes in schools and nursing facilities, or have restricted their use in other settings. Plaintiffs incurring injuries from the use of chafing dishes and steam tables have been awarded damages.

More recently, so called flexible heaters have been utilized for keeping food warm in commercial establishments. To date, these custom manufactured flexible heaters have fallen into two basic categories: those designed to fit either into steam warming tables where the temperature transfer between the device and the food is mediated by a layer of water, or by direct contact with food as in a warming cabinet. Several aspects of the construction of these flexible heaters make them unsuitable for table-top banquet style serving: The power to these heaters is integrated into the temperature control circuitry of the food warming cabinet or steam table. As such, these cannot be directly connected to 120 VAC, or operate independent of their host container. In addition, because the heaters are constructed for application to a stainless steel surface, they lack measures to prevent overheating of the surface to which they are affixed. Manufacture of these heaters involves vulcanizing a wire wound heating element where the wire elements are sheathed in fiberglass wrap, between two sheets of an elastomeric polymer such as silicone, neoprene or Kapton®. The fiberglass wrap is required because it adheres to silicone and as an aid in maintaining the pattern of the wire element during the lamination process. Because they are commonly constructed of layered sheet silicone that is manufactured on rolls, the finished product tends to naturally curl. Additionally, the manufacturing process common to flexible heaters using wire wound resistive heating elements produces a heating apparatus where the outline of the heating elements protrudes above the otherwise planar surface of the top layer. This introduces friction points that will abrade quickly possibly exposing the heating element when objects are moved on and off the pad frequently.

BRIEF SUMMARY OF THE INVENTION

The present invention is directed to a generally rectangular, low profile food warming mat for the serving of food banquet style. Unlike steam tables or chafing dishes where there is risk of scalding with the former, or uncontrolled ignition with the latter, the surface of the present invention may be touched while in use without incurring injury and yet conforms to current USDA food temperature safety recommendation stating that prepared food be held at a minimum of 140 degrees Fahrenheit for serving. In addition to the aforementioned safety benefits over traditional means of maintaining food temperature, the present invention has many advantages over conventional flexible heaters:

The present invention lays flat without curling of the edges due to a intermediate layer consisting of a wire wound heating element suspended in a matrix of injectable silicone.

The suspended wire wound element being encapsulated by the silicone matrix is planar on both top and bottom surfaces and when fused between a top layer and a bottom layer forming a heating mat, has no friction introducing protuberances. This makes it possible to manufacture a heating mat that will withstand the repeated contact of food containers without abrading of the top layer.

Moreover, injectable silicone possesses no memory, so the intermediate layer forms a buffer for stresses inherent in the top and bottom layers of roll silicone and the present invention will naturally lay flat without curling of the edges; although it may be manually rolled up for storing.

In an alternate embodiment, the present invention can be folded accordion style and stored within a bag. This is accomplished by mold forming a series of alternating transverse channels on both the top surface and bottom surface of the mat so that it folds upon itself accordion style for easy storage.

An object of the present invention is to provide a safe means of maintaining food temperature in a table-top banquet style setting.

Another object of the present invention is to provide a one piece food warming unit that is easily transported and stores readily.

A further object of the present invention is to provide a one piece warming unit that resists food debris and that is easily cleaned.

Still another object of the present invention owing to its space saving design, is to make possible the display of a greater variety of food items in banquet style.

Yet another object of the present invention is to provide evenness of heating across the entire surface of the warming unit.

Other objects and advantages of the present invention will become apparent from the following descriptions, taken in connection with the accompanying drawings, wherein by way of illustration and example, a preferred embodiment of the present invention is disclosed.

BRIEF DESCRIPTION OF SEVERAL VIEWS OF THE DRAWINGS

FIG. 5 shows a perspective view of another embodiment of the present invention with transverse channels;

FIG. 6 shows a edge view of the embodiment of FIG. 5 being folded upon itself;

FIG. 7 shows a sectioned edge view of the embodiment of FIG. 5 taken along lines 5-5;

DETAILED DESCRIPTION OF THE INVENTION

Definitions: castable elastomeric polymer is used to refer to castable polymers such as GT Products 1340 which is a two part silicone rubber compound designed for making flexible molds. Elastomeric polymer, refers to silicone provided by the roll and which has memory.

Figure 1:
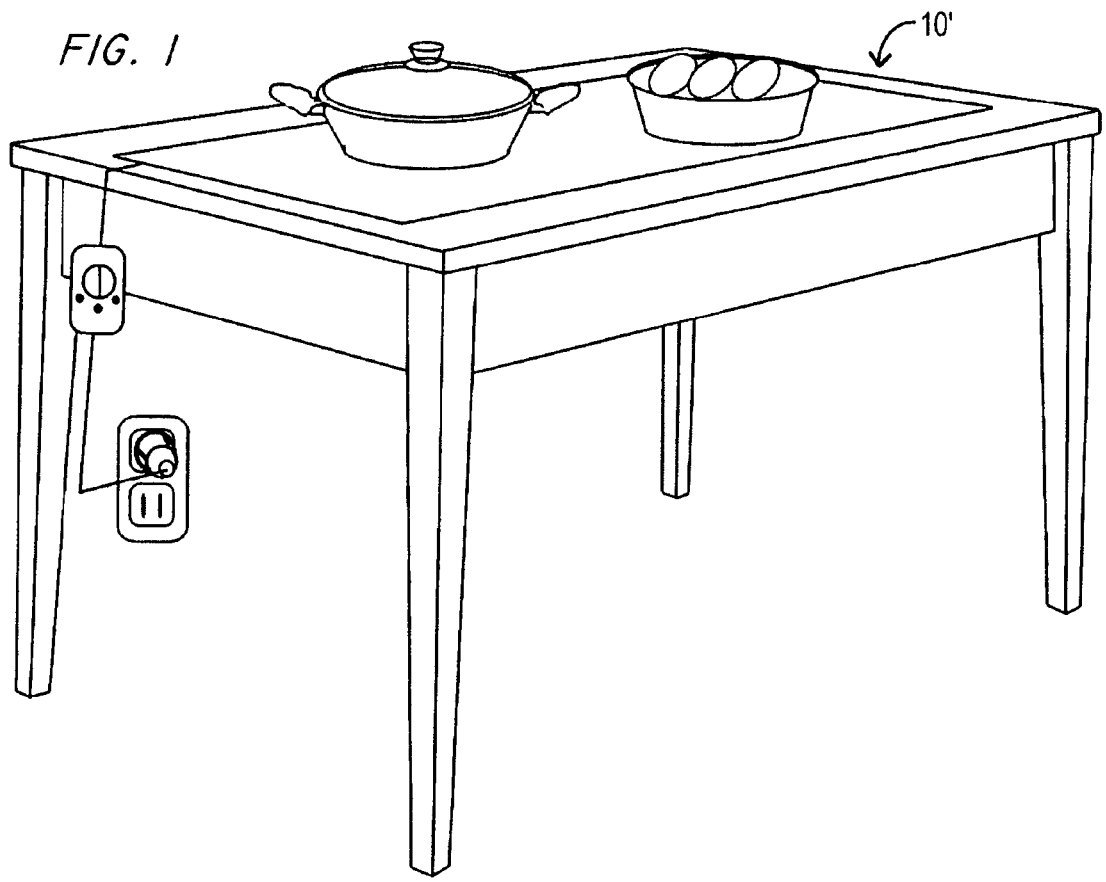
FIG. 1 is a perspective view of the preferred embodiment in typical use on a table top.

FIG. 1 shows the present invention 10' positioned between a table top and food containers in what would be a typical arrangement in use. The food warmer may be rolled up after use.

Figure 2:
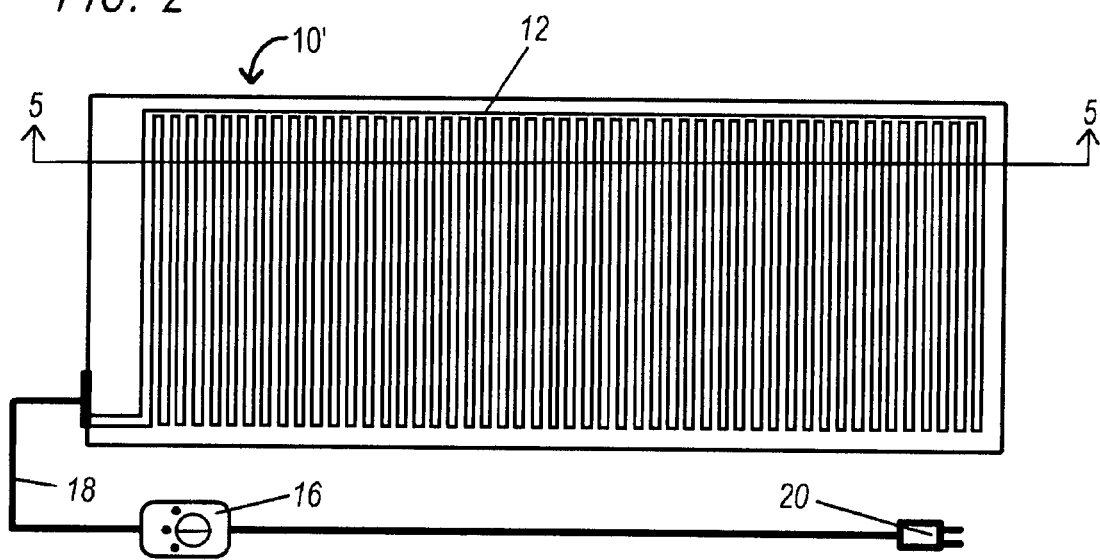
FIG. 2 is a plan view illustrating the pattern of heating elements.

FIG. 2 shows a plan view of the food warming mat 10' and the generally equidistant heating elements 12. Power control is provided by AC phase controller 16 with low medium and high settings corresponding to 140 degrees, 150 degrees and 160 degrees Fahrenheit wired inline of a three wire power cable having hot, neutral and ground wires, and residing between the plug and heating element. The AC phase controller utilizes a circuit such as shown in (FIG. 8), to simulate DC output to the heating elements. Wattage will vary according to the size of the element. Heat is transferred to the food containers by the mat by conduction. The types of resistive heating elements, wire wound, etched foil, and printed thick film (PTF) employed by the embodiments of the present invention are easily manufactured and durable. The temperature control is provided by economical inline AC phase controller (FIG. 8), to simulate DC current output. An insulative bottom layer 24 of (FIG. 2) serves to protect sensitive surfaces such as table tops from heat damage. The heating element pattern is predominantly transversely oriented to permit easy rolling, or folding of the present invention in the case of the embodiment using etched foil elements 36 and alternating channels 38 (FIG. 5).

In the preferred embodiment the heating element is of the wire wound type. The method of patterning and encapsulating the heating element dependably produces a continuous element where the windings are equidistant and symmetrical in appearance, necessary to provide uniform heating over the surface of the food warmer and involves the following processes:

A pin board and template for the patterning of the heating element windings to which one end of the element is fed, forming a symmetrical serpentine pattern. The area between the windings is then filled with an injectable silicone to form a suspended heating element encapsulated within a wafer of silicone. The pins are retracted after the polymer skins leaving the serpentine pattern intact. After curing, the suspended heating element is fused either by the use of a room temperature vulcanizing adhesive (RTV), or contact cement between two sheets of roll silicone and die cut into the rectangular shape of the mat, and the power control added. This method of producing an intermediate layer obtains two primary benefits:

truly uniform spacing between the windings thus providing the current invention with a uniformity of temperature on the contacting surface; and, an intermediate layer having no memory to serve as a buffering layer between layers of roll silicone. Alternately, castable silicone may be used in place of the rolled for the top and bottom layers.

Figure 3:
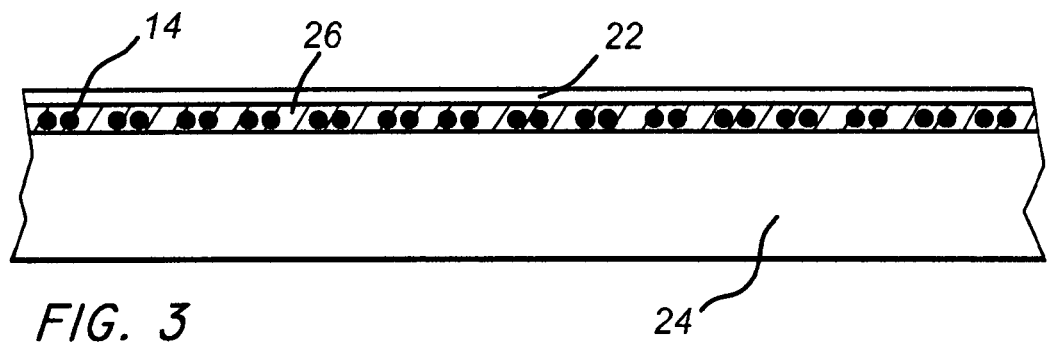
FIG. 3 is a enlarged sectional view illustrating the relationship of the resistive heating element and the top and bottom layers of the elastomeric polymer.

FIG. 3 shows a sectional view taken along lines 5-5 of (FIG. 2) illustrating the suspended heating element windings 14 within a silicone matrix 26 fused between a top facing layer of smooth elastic polymer 22 that is (1.5-2.0 mm) in thickness. Below the heating element windings is the bottommost layer 24 of closed cell elastomeric foam that insulates vulnerable surfaces from damaging heat. Although closed cell elastomeric foam is the preferred material, it is possible that fiber reinforced and fiberglass impregnated smooth silicone may be used as well. Fiber impregnated silicone confers strength benefits as well as reducing the cost of the silicone.

Figure 4:
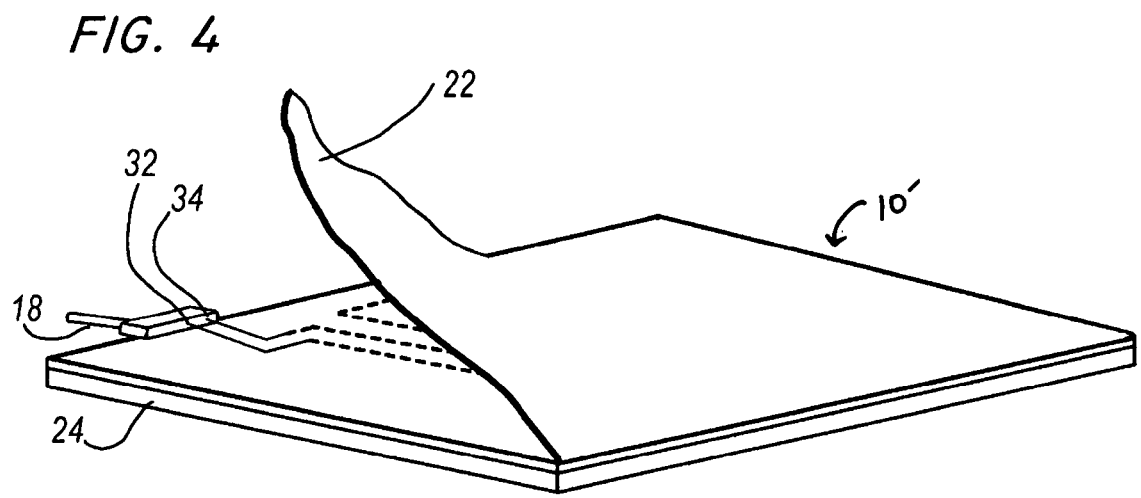
FIG. 4 is a perspective view of the preferred embodiment with part of the top layer of elastomeric polymer removed.
Figure 8:
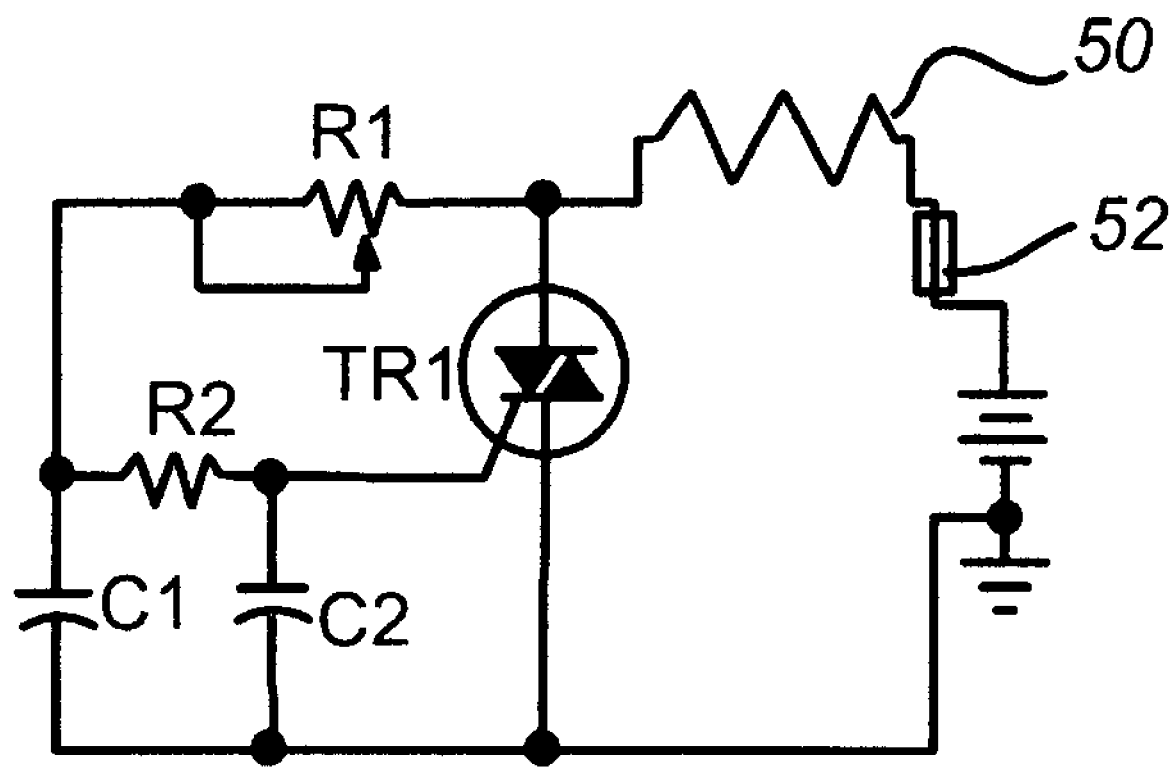
FIG. 8 is a diagram of the AC phase controller circuit.

FIG. 4 shows an exposed view with the top layer of smooth elastic polymer 22 pulled back to reveal the suspended wire wound element. The power and neutral wires 32, 34 are connected to the heating element and with no thermister required because hot containers of food will be placed on the food warming mat and this could falsely trigger the thermister. Overload protection of the circuit is provided by a fuse 52 of (FIG. 8).

FIG. 5 shows a view of another embodiment with multiple conjoined panels having set in them an etched foil embedment 36 where the panels are divided one from another by transverse alternating channels 38 on the top and bottom surfaces.

FIG. 6 illustrates the accordion folding of the warming mat made possible by the transverse alternating channels on the top and bottom surfaces.

FIG. 7 is a sectional detail view taken along lines 6-6 of (FIG. 5) that illustrates the etched foil embedments 36 connected by a flexible conductive wire 40 between the trough portion of the alternating channels 38 and the outer surfaces of the food warming mat. This configuration makes it possible to use otherwise inexpensive etched foil elements that commonly fatigue and crack when folded repeatedly because only the flexible conductive wires are flexed during the folding being so situated over the troughs of the channels 38.

FIG. 8 illustrates a typical AC phase controller circuit used to adjust current to the heating element 50 of the present invention, showing a 50K Pot (R1), a 15K ½ Watt resistor (R2), two 250V capacitors (C1,C2), a 40502 TRIAC (TR1) and a fast acting fuse (52), which rating would depend on the size of the heating element, but typically a 5 amp or 3 amp fast acting type. If required, an RF (noise) filter could easily be added.

While the invention has been described in connection with only two principal embodiments, it is not intended to limit the scope of the invention to the particular form set forth, but on the contrary, it is intended to cover such alternatives, modifications, and equivalents as may be included within the spirit and scope of the invention as defined by the appended claims.

We claim:

1. A substantially rectangular flexible food warming mat of low profile with a top surface and a bottom surface comprising:

a) a layered elastomeric polymer outer surface; and, b) a series of panels, each logically divided from the next by a transverse folding line; and, c) a plurality of transverse, alternating channels conjoining said panels, said channels having a substantially 'U' shaped profile with an arcuate trough, wherein every other is open either to the top or bottom surface of said mat such that mat may be accordion folded upon itself; and, d) a plurality of resistive heating element embedments, one per each of said panels; and, e) a plurality of flexible connectors embedded over arcuate troughs connecting said heating element embedments in series; and, f) a power cable connected to said heating element embedments at one end with an electrical plug for use with an electrical outlet providing 110-120 VAC; and, g) a temperature controlling means with low, medium and high setting residing inline of said power cable between said electrical plug and said plurality of resistive heating element embedments.

2. The food warming mat of claim 1 wherein said temperature controlling means comprises an AC phase controller circuit.

3. The food warming mat of claim 1 wherein said resistive heating element embedments are etched foil resistive heating elements and said flexible connectors are wire wound resistive heating elements.

4. The food warming mat of claim 1 wherein said resistive heating element is of a printed thick film type.

* * * * *